US009172694B2

(12) United States Patent
Canning et al.

(10) Patent No.: US 9,172,694 B2
(45) Date of Patent: Oct. 27, 2015

(54) PROPAGATING DELEGATED AUTHORIZED CREDENTIALS THROUGH LEGACY SYSTEMS

(75) Inventors: Simon Gilbert Canning, Upper Coomera (AU); Neil Ian Readshaw, Parkwood (AU); Stephen Viselli, Southport (AU); Shane Bradley Weeden, Paradise Point (AU)

(73) Assignee: International Business Machines Corporation, Armonk, NY (US)

( * ) Notice: Subject to any disclaimer, the term of this patent is extended or adjusted under 35 U.S.C. 154(b) by 604 days.

(21) Appl. No.: 13/477,052

(22) Filed: May 22, 2012

(65) Prior Publication Data

US 2013/0318569 A1    Nov. 28, 2013

(51) Int. Cl.
*H04L 29/06* (2006.01)

(52) U.S. Cl.
CPC .................................. *H04L 63/0815* (2013.01)

(58) Field of Classification Search
None
See application file for complete search history.

(56) References Cited

U.S. PATENT DOCUMENTS

| | | | |
|---|---|---|---|
| 866,904 A * | 9/1907 | Allenbrand ...................... 188/41 |
| 6,460,141 B1 * | 10/2002 | Olden ................................ 726/4 |
| 6,728,884 B1 * | 4/2004 | Lim .................................. 726/12 |
| 6,976,164 B1 * | 12/2005 | King et al. ...................... 713/156 |
| 7,188,109 B1 | 3/2007 | Christensen et al. |
| 7,191,467 B1 * | 3/2007 | Dujari et al. ........................ 726/5 |
| 7,210,167 B2 | 4/2007 | Brezak et al. ..................... 726/18 |
| 7,421,731 B2 * | 9/2008 | Mitchell et al. .................... 726/3 |
| 7,502,996 B2 * | 3/2009 | Fry ................................. 715/236 |
| 7,818,582 B2 * | 10/2010 | Marion et al. ................. 713/185 |
| 8,181,225 B2 * | 5/2012 | Hinton et al. ....................... 726/2 |
| 8,341,715 B2 * | 12/2012 | Sherkin et al. .................. 726/10 |
| 8,402,527 B2 * | 3/2013 | Austin et al. ....................... 726/9 |
| 8,799,639 B2 * | 8/2014 | Balazs et al. .................. 713/152 |
| 2001/0054148 A1 * | 12/2001 | Hoornaert et al. ............ 713/172 |
| 2003/0033535 A1 * | 2/2003 | Fisher et al. ................... 713/185 |
| 2003/0041263 A1 * | 2/2003 | Devine et al. ................. 713/201 |
| 2004/0098595 A1 * | 5/2004 | Aupperle et al. ............. 713/185 |
| 2004/0128392 A1 * | 7/2004 | Blakley et al. ................ 709/229 |
| 2004/0128546 A1 * | 7/2004 | Blakley et al. ................ 713/201 |
| 2006/0053296 A1 * | 3/2006 | Busboom et al. ............. 713/182 |
| 2006/0075224 A1 * | 4/2006 | Tao ................................ 713/164 |
| 2006/0185021 A1 * | 8/2006 | Dujari et al. ..................... 726/27 |
| 2006/0248598 A1 * | 11/2006 | Johnson et al. .................. 726/27 |
| 2007/0043954 A1 * | 2/2007 | Fox ............................... 713/185 |

(Continued)

OTHER PUBLICATIONS

Pfleeger (Charles P. Pfleeger, "Security in computing", 2nd edition, 1996, ISBN: 0133374866).*

(Continued)

*Primary Examiner* — Peter Poltorak
(74) *Attorney, Agent, or Firm* — VanLeeuwen & VanLeeuwen; Jeffrey S. LaBaw (57) ABSTRACT

An approach is provided to access resources at legacy systems. In this approach, a resource request destined to a legacy system is receiving from a requestor with the resource request including an access token and being on behalf of a resource owner. A validation process is performed on the access token. If the access token is valid, the approach identifies the resource owner and one or more legacy access tokens used to access the legacy system. Another request is formed with the new request including the legacy access tokens. The new request is transmitted to the legacy system and a response is received back from the legacy system. The response received from the legacy system is transmitted back to the requestor.

21 Claims, 9 Drawing Sheets

(56) References Cited

U.S. PATENT DOCUMENTS

| | | | |
|---|---|---|---|
| 2008/0059804 A1* | 3/2008 | Shah et al. | 713/186 |
| 2008/0263365 A1* | 10/2008 | Aupperle et al. | 713/185 |
| 2009/0024755 A1* | 1/2009 | Rathore et al. | 709/231 |
| 2009/0328166 A1* | 12/2009 | Burch et al. | 726/6 |
| 2010/0095372 A1* | 4/2010 | Hodgkinson et al. | 726/20 |
| 2012/0331518 A1* | 12/2012 | Lee | 726/1 |
| 2013/0311771 A1* | 11/2013 | Hoggan | 713/156 |
| 2013/0318569 A1* | 11/2013 | Canning et al. | 726/4 |

OTHER PUBLICATIONS

Hasan et al., "Please Permit Me: Stateless Delegated Authorization in Mashups," Computer Security Applications Conference, Dec. 2008, 10 pages.

The OAuth 1.0 Protocol, Internet Engineering Task Force (IETF) Request for Comments 5849, edited by E. Hammer-Lahav, Apr. 2010, 29 pages.

* cited by examiner

PROPAGATING DELEGATED AUTHORIZED CREDENTIALS THROUGH LEGACY SYSTEMS

TECHNICAL FIELD

The present disclosure relates to an approach where users authorize third party application to act on their behalf and such authorization is transformed to legacy authorization tokens to access legacy systems on the user's behalf.

BACKGROUND OF THE INVENTION

Delegated authorization standards describe methods by which users may authorize third party applications to access their protected resources (e.g. personal information) that exist on a private resource server. A primary goal of delegated authorization is to facilitate this authorization without exposing the user's username and password to the third party application. An example of such a standard is the OAuth protocol. These protocols provide many benefits over traditional methods of application to application authentication and authorization, such as basic authentication, as they may limit the exposure of user's credentials and introduce additional methods of validating the identity of the client application independently to the user's identity. They are also preferred over custom or proprietary authorization mechanisms as they provide an open, well documented, standard method for authenticating and authorizing third party applications. However, many legacy applications rely on traditional or custom authentication methods, and cannot be updated to support new standards, due to technical or budget constraints.

SUMMARY

An approach is provided to access resources at legacy systems. In this approach, a resource request destined to a legacy system is receiving from a requestor with the resource request including an access token and being on behalf of a resource owner. A validation process is performed on the access token. If the access token is valid, the approach identifies the resource owner and one or more legacy access tokens used to access the legacy system. Another request is formed with the new request including the legacy access tokens. The new request is transmitted to the legacy system and a response is received back from the legacy system. The response received from the legacy system is transmitted back to the requestor.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
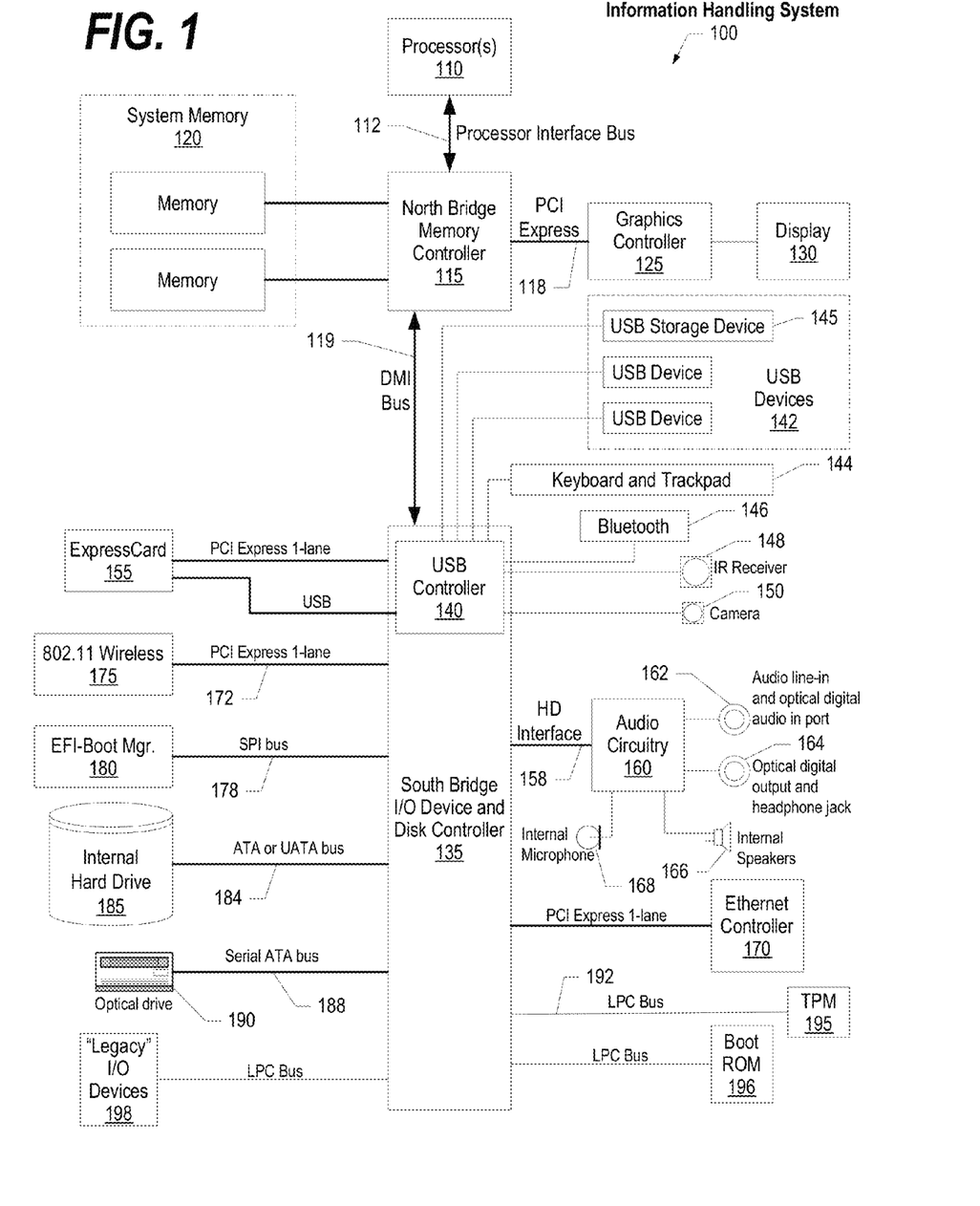
FIG. 1 is a block diagram of a data processing system in which the methods described herein can be implemented.
Figure 2:
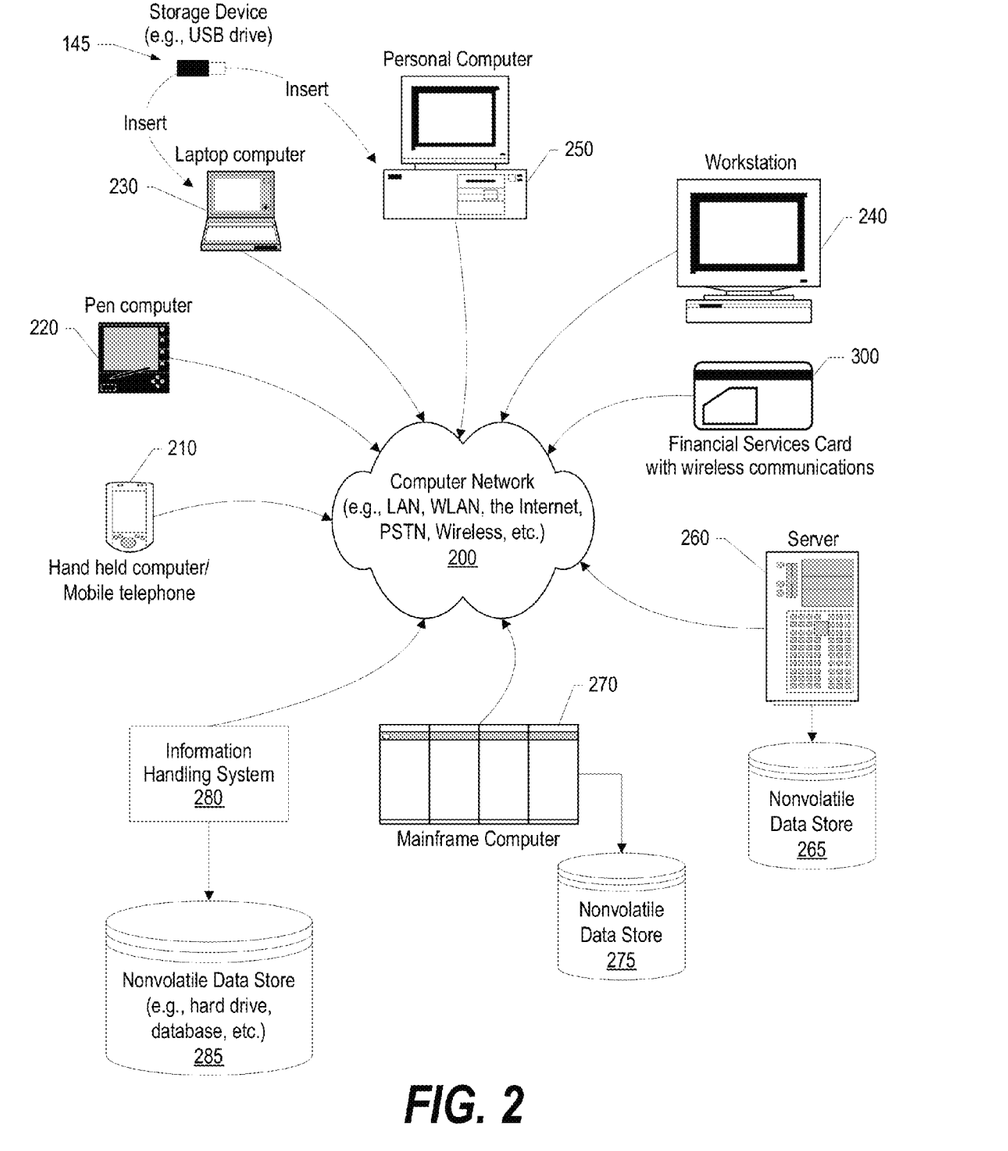
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE .802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
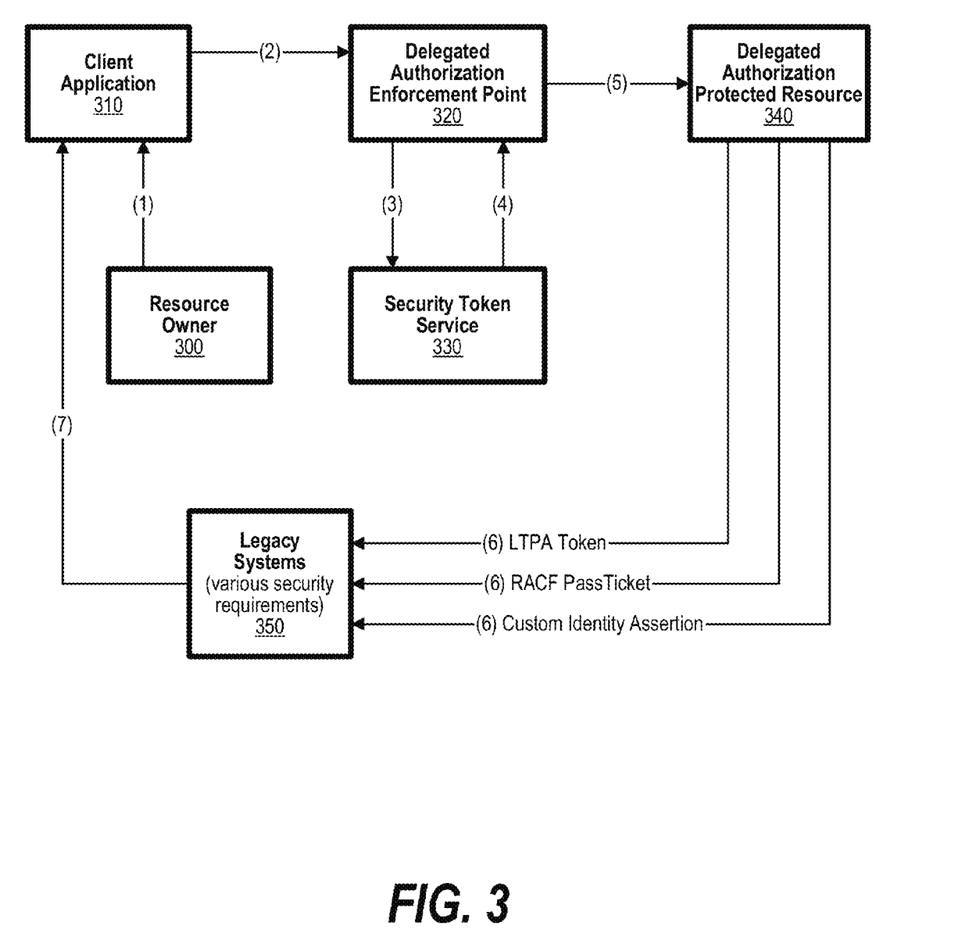
FIG. 3 is a component diagram depicting various components used to provide legacy access tokens to legacy systems.

FIG. 3 is a component diagram depicting various components used to provide legacy access tokens to legacy systems. In a traditional environment, the web service request to the legacy back-end is made in the context of the resource owner. However, in a traditional system the delegated authorization aware application contains an opaque access token that represents the resource owner's initial authorization grant. For these reasons, an approach is needed to bridge the gap between delegated authorization standards and legacy applications that are not delegated-authorization-aware. Such an approach is shown in FIG. 3. This approach augments legacy systems with the added security benefits of an open standard for delegated authorization, without requiring the existing system to change its own authentication mechanism. This approach works by having a delegated-authorization-aware policy enforcement point (PEP) consume the incoming delegated access token from a client (e.g., client application 310) and, if valid, have legacy tokens representing the protected resource owner (end user identity) generated and used as part of accessing back-end legacy applications (e.g., legacy systems 350) required to fulfill the protected resource request. The initial policy enforcement point is a 'delegated authorization protocol aware' (e.g. OAuth) application but in order to fulfill the request, additional systems that are not delegated authorization aware are accessed.

As shown in FIG. 3, the approach provides an environment in which a client (e.g., client application 310) accesses a protected resource via a policy enforcement point on behalf of resource owner 350. As part of the request for the protected resource, legacy systems are accessed that require an a legacy access token, such as an LTPA token, a RACF PassTicket, and a custom identity assertion. These legacy access tokens represent the resource owner in order to fulfill the request. Legacy systems 350 represent legacy systems whose authentication/authorization regimes are intentionally unchanged.

In dataflow (1), resource owner 300 (e.g., user, etc.) grants a client (client application 310) permission to act on the owner's behalf using a delegated authorization protocol such as OAuth. The result of this exercise is that the client application obtains a security token known as an "access token" which represents the permission granted by the resource owner. In dataflow (2), client application 310 requests a protected resource and includes the access token in the request. In dataflow (3), policy enforcement point 320 intercepts the request and, as part of validating the access token, the policy enforcement point calls security token service (STS) 330.

In the approach provided, STS 330 validates the access token and identifies the authorizing user identity (resource owner). Based on its configuration, in dataflow (4) the STS returns the authorization decision and a plurality of legacy access tokens representing the resource owner in formats needed by the legacy systems that will be accessed to fulfill the request (e.g., LTPA token, Kerberos token, RACF PassTicket, etc.).

At dataflow (5), assuming the access token was validated, enforcement point 320 propagates the legacy tokens representing the resource owner to delegated authorization aware protected resource 340. At dataflow (6), delegated authorization aware protected resource 340 consumes the request and utilizes the propagated legacy security tokens to contact legacy systems 350 on behalf of resource owner 300. At dataflow (7), legacy systems 350 consume the request from the protected resource application, authenticate and authorize the resource owner based on one or more legacy access tokens that are included with the request, process the request, and return the response to the requestor (typically via the protected resource application). In another embodiment the delegated authorization aware enforcement point and protected resource server can be the same entity.

Figure 4:
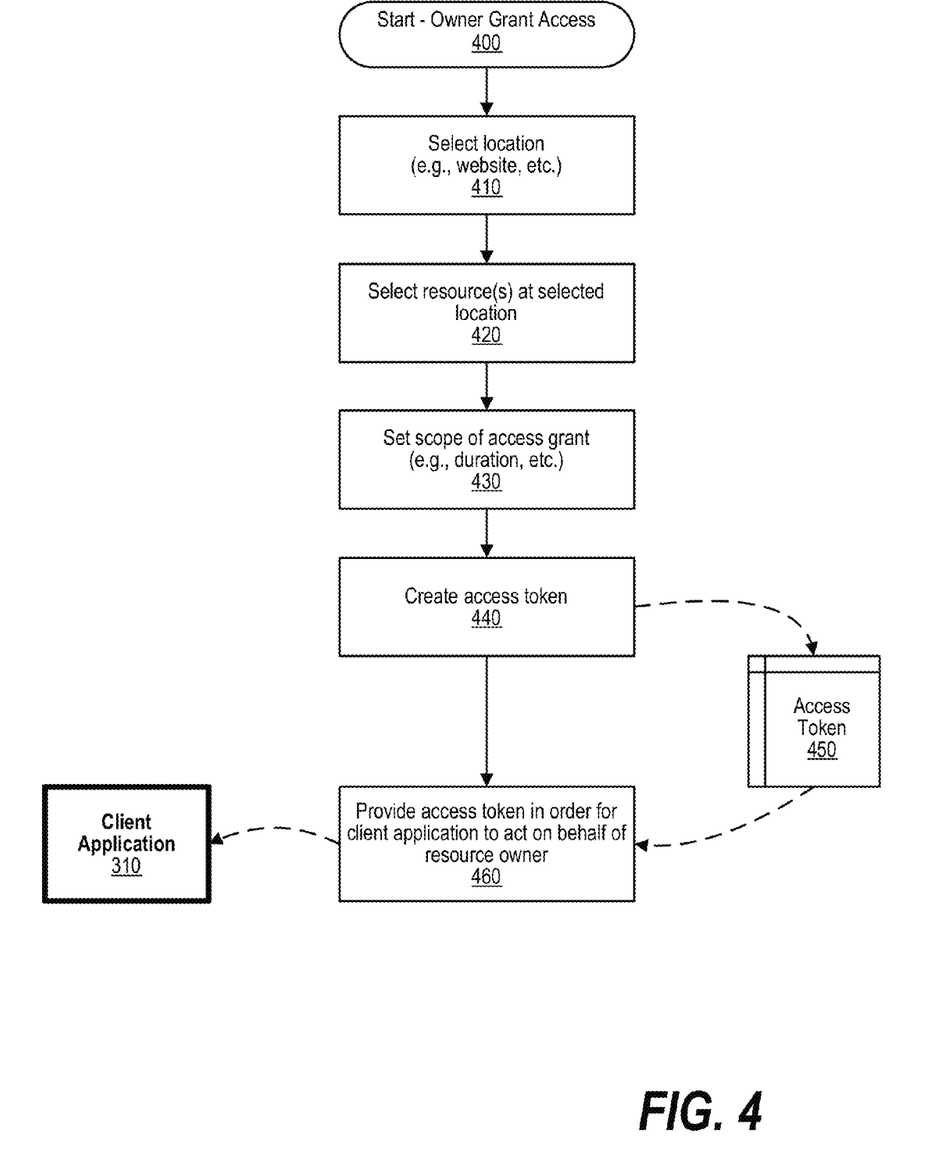
FIG. 4 is a flowchart showing steps taken by the resource owner to grant access by creating an access token and providing it to an application.

FIG. 4 is a flowchart showing steps taken by the resource owner to grant access by creating an access token and providing it to an application. Processing commences at 400 whereupon, at step 410, the resource owner selects a location where the resource is stored (e.g., a website, etc.). At step 420, the user selects the particular resources at the selected location for which access is being granted. At step 430, the user sets a scope of the access grant, such as the duration of the grant, etc., At step 440, access token 450 is created which allows a client (e.g., a client application, etc.) to act on behalf of the resource owner with requests pertaining to the resource owned by the resource owner. At step 460, the resource owner provides the created access token to client application 310 so that the client application can act on behalf of the resource owner and have access to the protected resource. In one embodiment, the resource owner also creates legacy access tokens (e.g., LTPA token, RACF PassTicket, custom identity assertions, etc.). These legacy access tokens are stored at security token service (STS) for use when accessing the owner's resources maintained by legacy systems.

Figure 5:
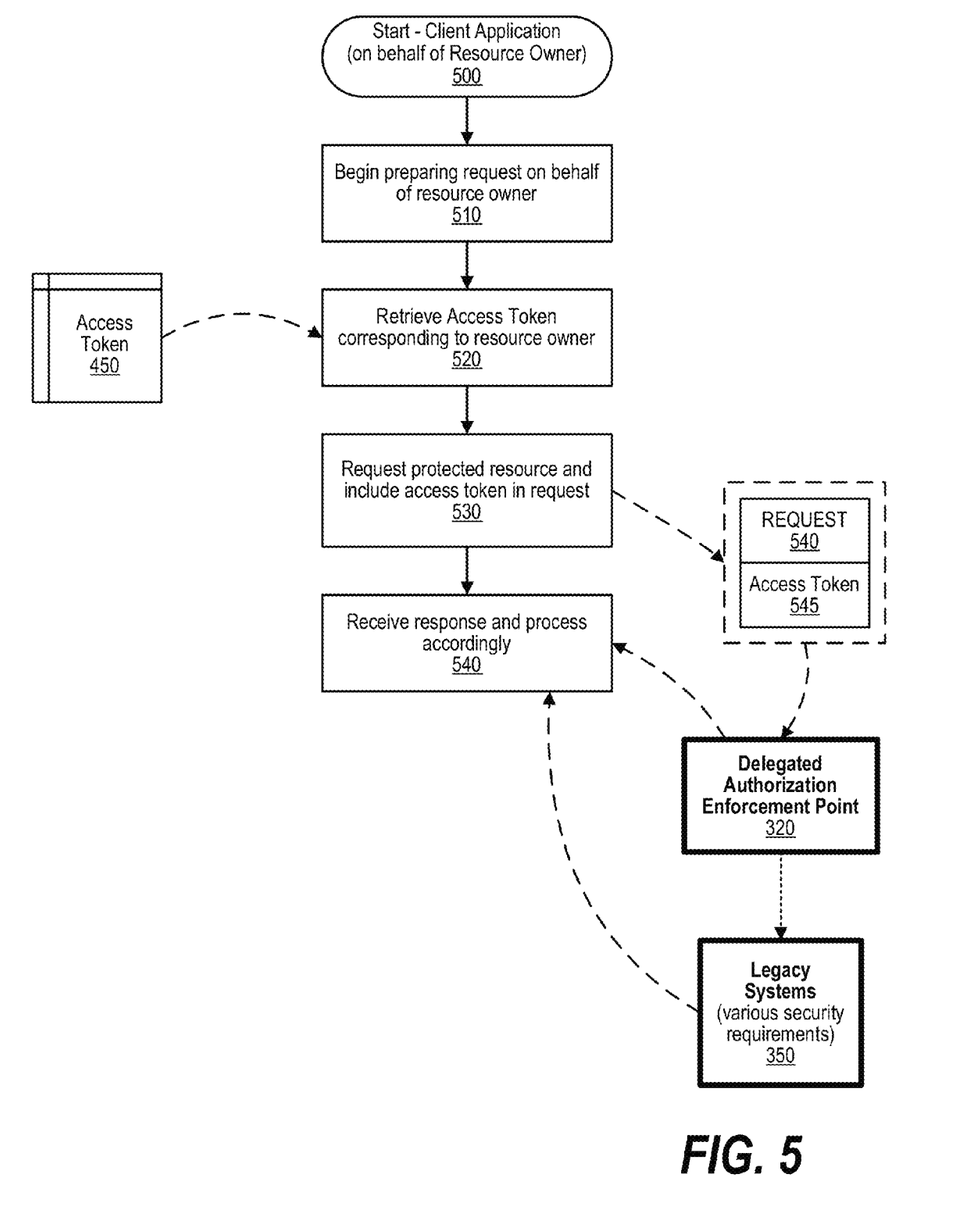
FIG. 5 is a flowchart showing steps performed by a client application acting on behalf of a resource owner by utilizing the access token.

FIG. 5 is a flowchart showing steps performed by a client application acting on behalf of a resource owner by utilizing the access token. Processing by the client application commences at 500 whereupon, at step 510, the client application begins preparing a request on behalf of the resource owner. The resource is maintained by a legacy system. At step 520, the client application retrieves access token 450 that was previously provided to the client application by the resource owner as shown and described in FIG. 4. At step 530, the client application creates request 540 for a restricted resource and includes the retrieved access token (545) with the request. The request is designated to legacy system 350. However, delegated authorization enforcement point 320 intercepts the request in order for the legacy access tokens to be included with the request rather than the access token. At step 540, the client application receives the response from the legacy system (e.g., directly or forwarded from the delegated authorization enforcement point).

Figure 6:
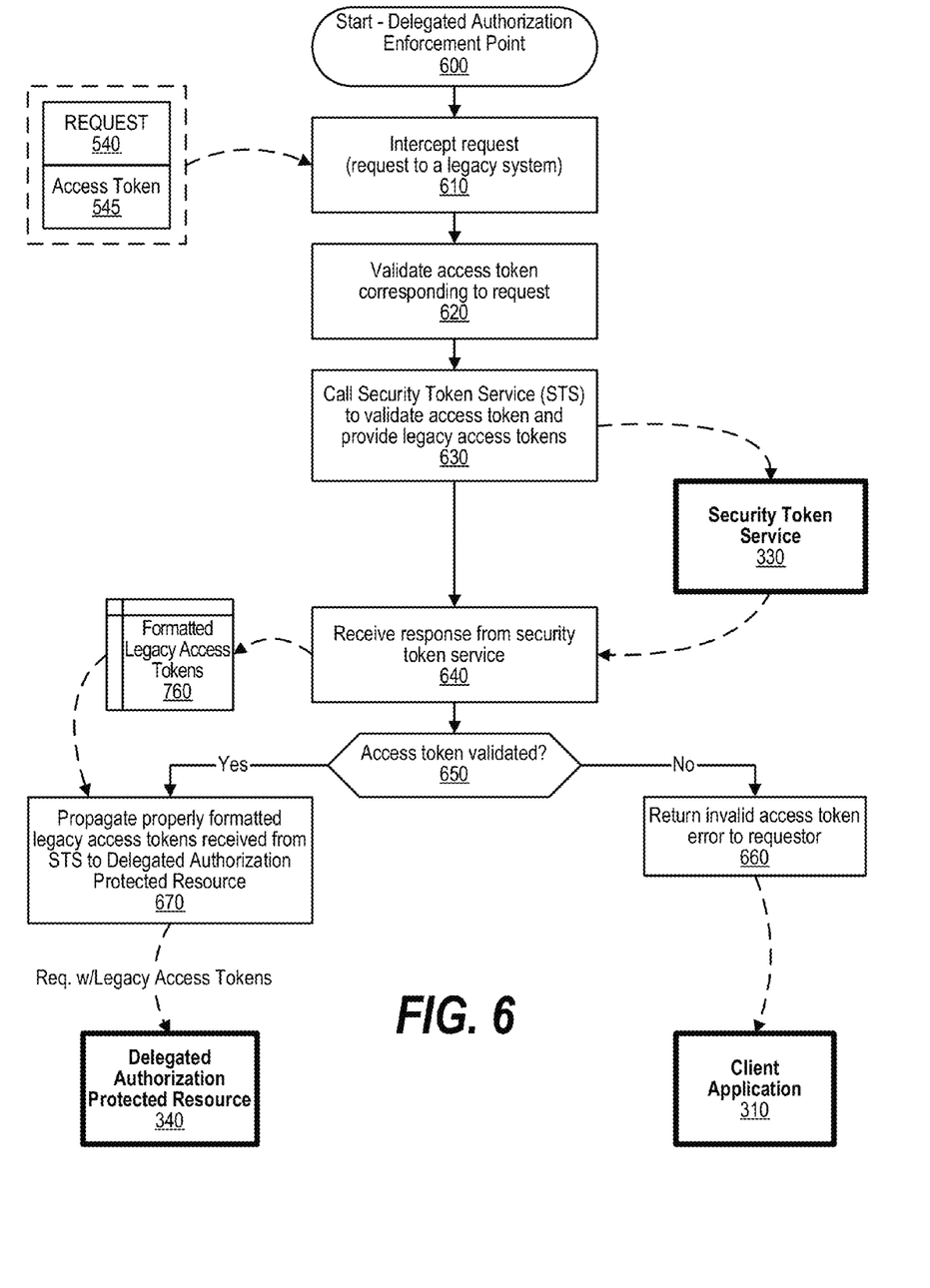
FIG. 6 is a flowchart showing steps performed by a delegated authorization enforcement point that intercepts the client application's request.

FIG. 6 is a flowchart showing steps performed by a delegated authorization enforcement point that intercepts the client application's request. Processing performed by the delegated authorization enforcement point commences at 600 whereupon, at step 610, the delegated authorization enforcement point intercepts a request (e.g., a request from a client application to a legacy system, etc.). As shown, the request includes the actual request 540 as well as access token 545. At step 620, the delegated authorization enforcement point validates the access token included in the request. In one embodiment, this is accomplished by calling a security token service (STS) which validates the access token as well as retrieving the legacy access token, or tokens, that correspond to the resource owner that created the access token. Security token service 330 performs the validation and retrieval processes and returns responsive data (e.g., completion codes, legacy access tokens, etc.) back to the delegated authorization enforcement point at step 640. In one embodiment, the legacy access tokens are formatted by the security token service and stored in memory area 760 for further use by the delegated authorization enforcement point.

A determination is made by the delegated authorization enforcement point as to whether the access token that was included in the request is valid (decision 650). If the access token is not valid (unsuccessful validation), then decision 650 branches to the "no" branch whereupon, at step 660, the delegated authorization enforcement point returns an error to the requestor (e.g., client application 310) indicating that the access token included in the request is invalid. On the other hand, if the access token is valid (successful validation), then decision 650 branches to the "yes" branch whereupon, at step 670, the delegated authorization enforcement point propagates (transmits) the properly formatted legacy access tokens received from the security token service to delegated authorization protected resource 340 which will consume the request and contact the legacy system on behalf of the resource owner using the legacy access token (or tokens).

Figure 7:
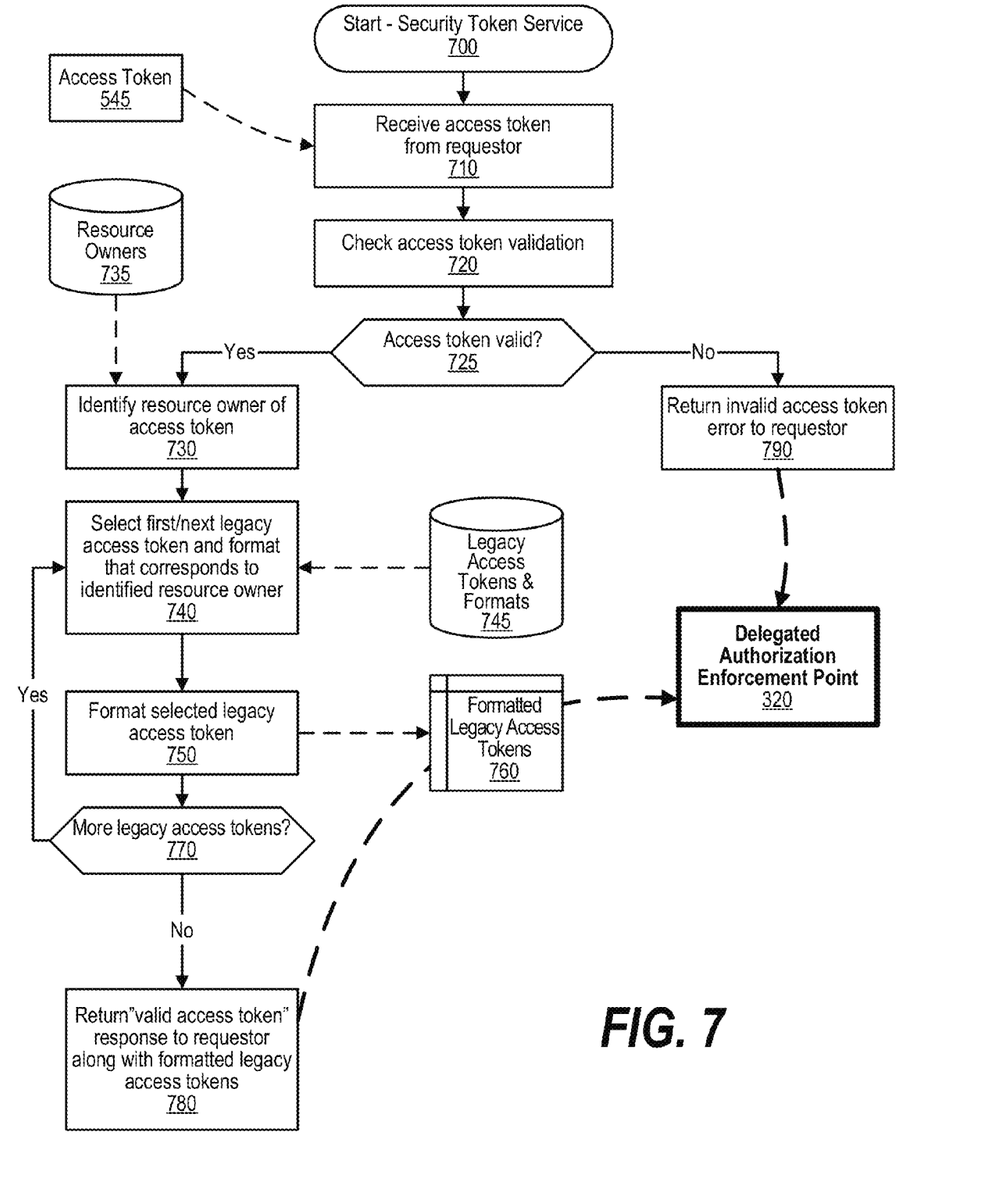
FIG. 7 is a flowchart showing steps performed by a security token service (STS) in validating an access token and providing legacy access tokens used to access legacy systems.

FIG. 7 is a flowchart showing steps performed by a security token service (STS) in validating an access token and providing legacy access tokens used to access legacy systems. Processing commences at 700 whereupon, at step 710, the security token service receives an access token (e.g., access token 545) from a requestor, such as a delegated authorization enforcement point. At step 720, the security token service analyzes the received access token and checks to ensure that it is a valid security token. A determination is made by the security token service as to whether the access token is valid (decision 725). If the access token is not valid (unsuccessful validation), then decision 725 branches to the "no" branch whereupon, at step 790 the security token service returns an error to the requestor (e.g., delegated authorization enforcement point 320) indicating that the access token was unsuccessfully validated.

On the other hand, if the security token service successfully validates the access token, then decision 725 branches to the "yes" branch for further processing. At step 730, the security token service identifies the resource owner of the access token by matching the access token to the proper resource owner stored in data store 735. At step 740, the security token service processes and transforms the access token to generate one or more legacy tokens. The transformation of the access token is based on the type of legacy system that is being accessed. For example, if the legacy system that is being accessed is a mainframe, then the legacy access token that is created is a RACF PassTicket. If the legacy system that is being accessed is a Microsoft Windows™ based operating system, then the legacy token that is created is a Kerberos ticket. Other types of legacy systems may require different types of legacy access tokens (e.g., LTPA token, custom identity assertion token, etc.) and these other types of legacy access tokens are processed and created at step 740. At step 750, the security token service formats (creates) the legacy access token by transforming the access token according to formatting instructions corresponding to the type of legacy system that is being accessed. Formatting instructions are retrieved from data store 745. The formatted legacy access token is stored in memory area 760. A determination is made by the security token service as to whether there are more legacy access tokens that need to be created based on the type of legacy system that is being accessed (decision 770). If there are more legacy access tokens that need to be created, then decision 770 branches to the "yes" branch which loops back to format (create) and store the next legacy access token that corresponds to the type of legacy system that is being accessed. This looping continues until all of the legacy access tokens needed to access the legacy system have been created, as described above, at which point decision 770 branches to the "no" branch. At step 780, the security token service returns a return code to the requestor (e.g., delegated authorization enforcement point 320) indicating that the access token was successfully validated. In addition, at step 780 the security token service returns the formatted legacy access tokens back to delegated authorization enforcement point 320.

Figure 8:
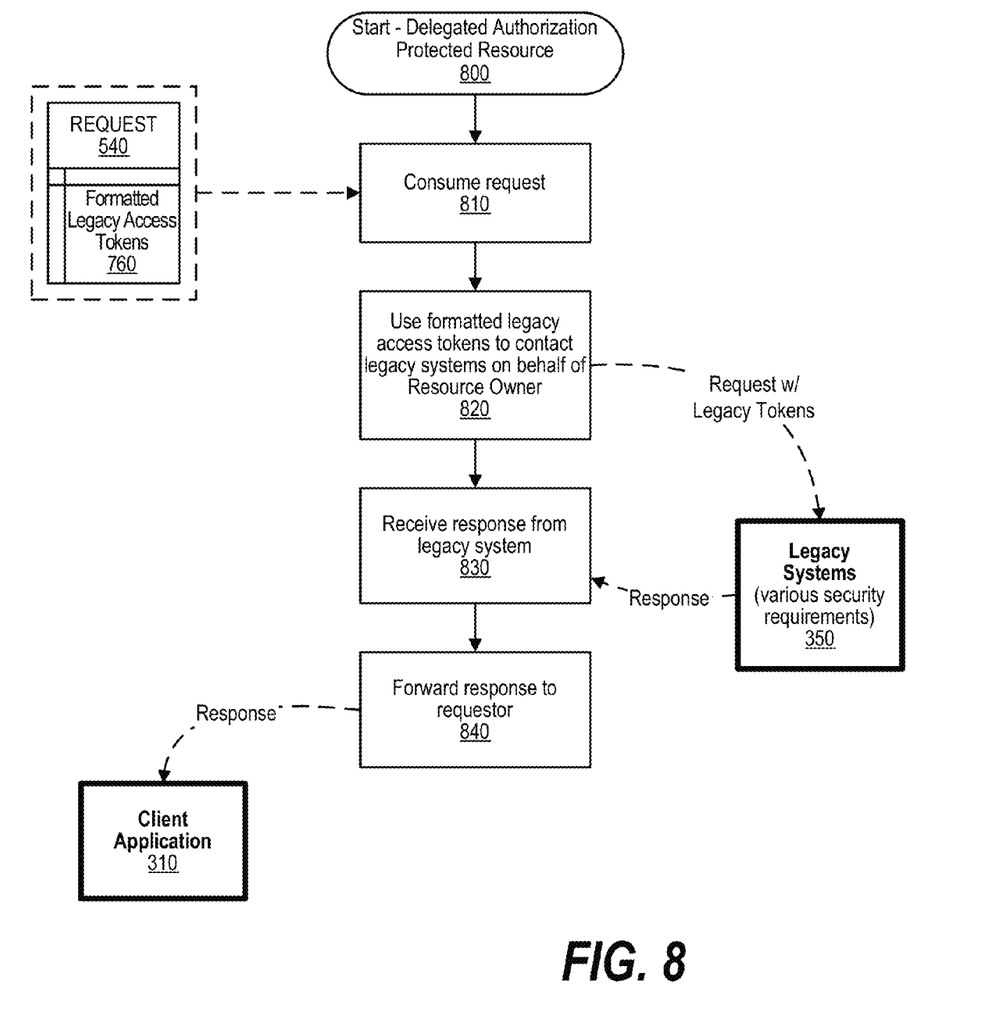
FIG. 8 is a flowchart showing steps performed by a delegated authorization protected resource to prepare and forward a request to the legacy system by utilizing legacy access tokens.

FIG. 8 is a flowchart showing steps performed by a delegated authorization protected resource to prepare and forward a request to the legacy system by utilizing legacy access tokens. Delegated authorization protected resource processing commences at 800 whereupon, at step 810, the delegated authorization protected resource consumes the request received from the requestor (e.g., the delegated authorization enforcement point). As shown, the request now includes the original resource request 540 along with formatted legacy access tokens 760. At step 820, the delegated authorization protected resource uses the formatted legacy access tokens to contact legacy system 350 on behalf of the resource owner in order to access a restricted resource maintained by the legacy system. As previously described, the legacy system uses a legacy access token, such as an LTPA token, a RACF PassTicket, a custom identity assertion token, or the like, in order to allow access to restricted resources owned by the resource owner. Using the legacy access token, the delegated authorization protected resource is able to send request 540 to the legacy system and receive a response back from the legacy system at step 830. At step 840, the received response is forwarded back to the original requestor, such as client application 310.

Figure 9:
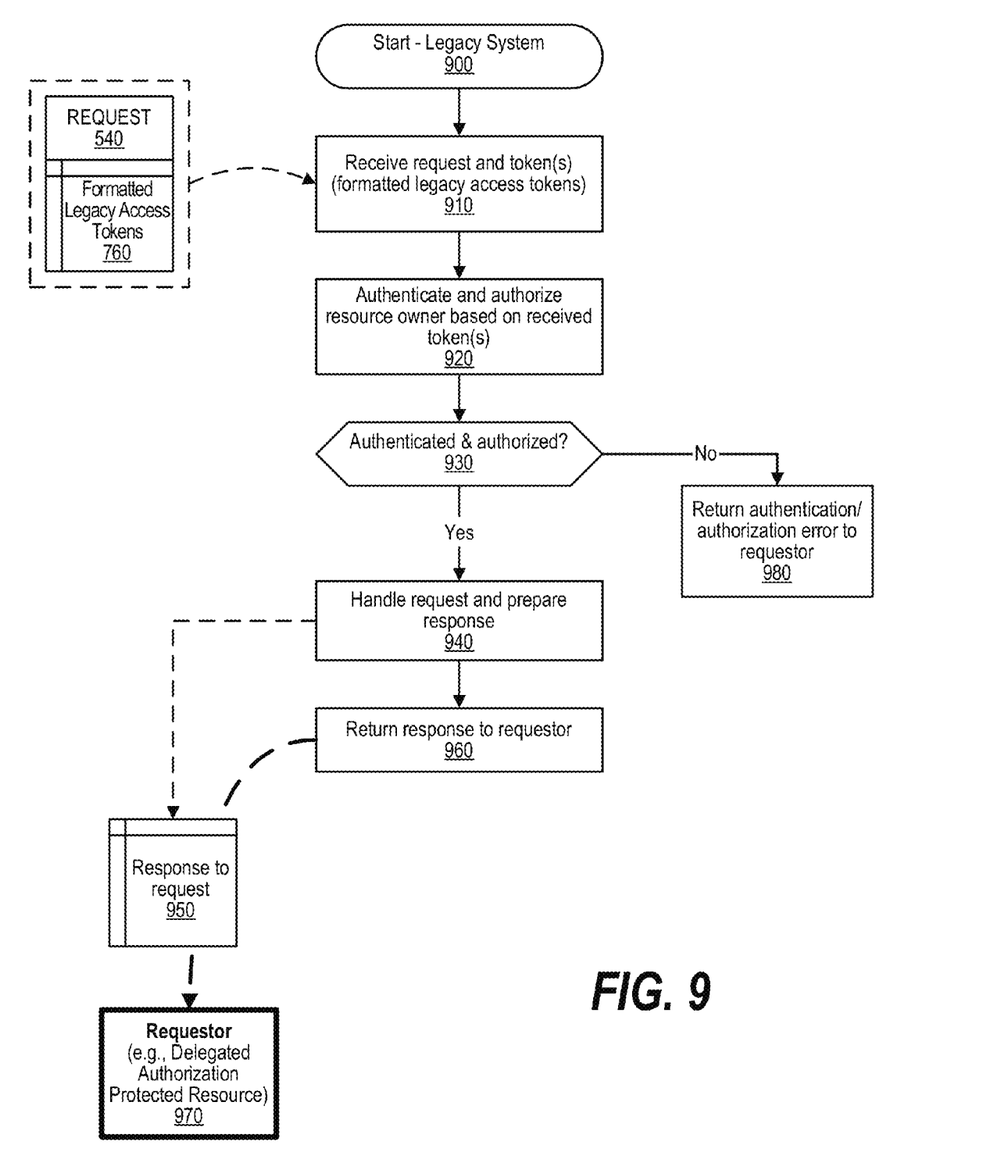
FIG. 9 is a flowchart showing steps performed by the legacy system.

FIG. 9 is a flowchart showing steps performed by the legacy system. Legacy application processing commences at 900. As previously discussed, the approach described herein allows the client application to use an access token to send a request to the legacy system without having to change or modify the legacy system. Since the legacy system does not process access tokens, the legacy access tokens are transmitted to the legacy system along with the request. At step 910, the legacy system receives the request and the formatted legacy access tokens from the requestor (e.g., delegated authorization protected resource 340). At step 920, the legacy system authenticates and authorizes the resource owner based on the legacy access tokens that were received with the request. A determination is made by the legacy system as to whether the legacy access token (or tokens) are successfully authenticated and authorized (decision 930). If the legacy access tokens are successfully authenticated and authorized, then decision 930 branches to the "yes" branch for further processing. At step 940, the legacy system handles the request and prepares a response to the request. The response is stored in memory area 950. At step 960, the legacy system returns the response to requestor 970 (e.g., the delegated authorization protected resource, the client application, etc.). Returning to decision 930, if one of the legacy access tokens is not authenticated and authorized, then decision 930 branches to the "no" branch whereupon, at step an authentication/authorization error is transmitted back to requestor 970.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system comprising:
    receiving, over an electronic data channel, a delegated access token from a requesting client application, the delegated access token including references to a resource owner, a client application and a scope, wherein the client application is acting on behalf of a resource owner, wherein the client application received the delegated access token from the resource owner, and wherein the request is designated to a legacy system;
    validating the delegated access token; and
    in response to a successful validation:
        transforming the delegated access token into one or more legacy access tokens; and
        transmitting at least one of the one or more legacy access tokens to the legacy system.

2. The method of claim 1 further comprising:
    identifying the resource owner corresponding to the delegated access token, wherein the one or more legacy access tokens correspond to the identified resource owner.

3. The method of claim 1 further comprising:
    intercepting the request at a delegated authorization enforcement point; and
    transmitting the request to a Security Token Service (STS), wherein the STS performs the validating of the delegated access token and the transformation of the delegated access token to the one or more legacy access tokens.

4. The method of claim 1, wherein transforming the delegated access token further comprises:
    formatting at least one of the one or more legacy access tokens prior to the transmitting, wherein the at least one formatted legacy access token is in a format suitable for use by the legacy system.

5. The method of claim 1 further comprising:
    identifying a legacy system type pertaining to the legacy system that is being accessed;
    identifying the one or more legacy access tokens used to access the identified legacy system type; and
    creating the one or more legacy access tokens by transforming the delegated access token to the one or more legacy access tokens based on a format that corresponds to each of the one or more legacy access tokens.

6. The method of claim 1 further comprising:
    retrieving a legacy format corresponding to a selected one of the one or more legacy access tokens; and
    formatting the selected legacy access token based on the retrieved legacy format.

7. An information handling system comprising:
    one or more processors;
    a memory coupled to at least one of the processors;
    a network adapter that connects the information handling system to a computer network; and
    a set of instructions stored in the memory and executed by at least one of the processors, wherein the set of instructions perform actions of:
        receiving, over an electronic data channel, a delegated access token from a requesting client application, the delegated access token including references to a resource owner, a client application and a scope, wherein the client application is acting on behalf of a resource owner, wherein the client application received the delegated access token from the resource owner, and wherein the request is designated to a legacy system;
        validating the delegated access token; and
        in response to a successful validation:
            transforming the delegated access token into one or more legacy access tokens; and
            transmitting at least one of the one or more legacy access tokens to a legacy system.

8. The information handling system of claim 7 wherein the actions further comprise:
    identifying the resource owner corresponding to the delegated access token,
    wherein the one or more legacy access tokens correspond to the identified resource owner.

9. The information handling system of claim 7 wherein the actions further comprise:
    intercepting the request at a delegated authorization enforcement point; and
    transmitting the request to a Security Token Service (STS), wherein the STS performs the validating of the delegated access token and the transformation of the delegated access token to the one or more legacy access tokens.

10. The information handling system of claim 7 wherein the actions further comprise:
    formatting at least one of the one or more legacy access tokens prior to the transmitting, wherein the at least one formatted legacy access token is in a format suitable for use by the legacy system.

11. The information handling system of claim 7 wherein the actions further comprise:
    identifying a legacy system type pertaining to the legacy system that is being accessed;
    identifying the one or more legacy access tokens used to access the identified legacy system type; and
    creating the one or more legacy access tokens by transforming the delegated access token to the one or more legacy access tokens based on a format that corresponds to each of the one or more legacy access tokens.

12. The information handling system of claim 7 wherein the actions further comprise:
    retrieving a legacy format corresponding to a selected one of the one or more legacy access tokens; and
    formatting the selected legacy access token based on the retrieved legacy format.

13. A computer program product stored in a non-transitory computer readable storage medium, comprising computer instructions that, when executed by an information handling system, causes the information handling system to perform actions that include:
  receiving, over an electronic data channel, a delegated access token from a requesting client application, the delegated access token including references to a resource owner, a client application and a scope, wherein the client application is acting on behalf of a resource owner, wherein the client application received the delegated access token from the resource owner, and wherein the request is designated to a legacy system;
  validating the delegated access token; and
  in response to a successful validation:
    transforming the delegated access token into one or more legacy access tokens; and
    transmitting at least one of the one or more legacy access tokens to a legacy system.

14. The computer program product of claim 13 further comprising:
  identifying the resource owner corresponding to the delegated access token,
  wherein the one or more legacy access tokens correspond to the identified resource owner.

15. The computer program product of claim 13 further comprising:
  intercepting the request at a delegated authorization enforcement point; and
  transmitting the request to a Security Token Service (STS), wherein the STS performs the validating of the delegated access token and the transformation of the delegated access token to the one or more legacy access tokens.

16. The computer program product of claim 13 further comprising:
  formatting at least one of the one or more legacy access tokens prior to the transmitting, wherein the at least one formatted legacy access token is in a format suitable for use by the legacy system.

17. The computer program product of claim 13 further comprising:
  identifying a legacy system type pertaining to the legacy system that is being accessed;
  identifying the one or more legacy access tokens used to access the identified legacy system type; and
  creating the one or more legacy access tokens by transforming the delegated access token to the one or more legacy access tokens based on a format that corresponds to each of the one or more legacy access tokens.

18. The computer program product of claim 13 further comprising:
  retrieving a legacy format corresponding to a selected one of the one or more legacy access tokens; and
  formatting the selected identified legacy access token based on the retrieved legacy format.

19. A method implemented by an information handling system comprising:
  receiving, from a requestor, a first resource request destined to a legacy system,
  wherein the first resource request includes a delegated access token from a requesting client application, the delegated access token including references to a resource owner, a client application and a scope, wherein the requesting client application is acting on behalf of a resource owner, wherein the client application received the delegated access token from the resource owner;
  performing a validation process on the delegated access token; and in response to the delegated access token being valid:
    identifying the resource owner corresponding to the delegated access token;
    transforming the delegated access token into one or more legacy access tokens;
    forming a second resource request that includes at least one of the one or more legacy access tokens;
    transmitting the second resource request to the legacy system; receiving a response from the legacy system; and
    transmitting the response to the requestor.

20. A method implemented by an information handling system comprising:
  receiving, over an electronic data channel, a delegated access token with a request from a requesting client application, the delegated access token including references to a resource owner, a client application and a scope,
  wherein the client application is acting on behalf of the resource owner, wherein the client application received the delegated access token from the resource owner, and wherein the request is designated to a legacy system;
  validating the delegated access token; and
  in response to a successful validation and receipt of the delegated access token: selecting one of a plurality of legacy access tokens, wherein the selected legacy access token corresponds to the delegated access token and is of an appropriate format for the legacy system for which the request is directed; and
  transmitting the selected legacy access token to the legacy system.

21. The method as recited in claim 20, further comprising changing the scope of the delegated access token in response to user input prior to receiving the delegated access token.

* * * * *